United States Patent Office 3,070,761
Patented Dec. 25, 1962

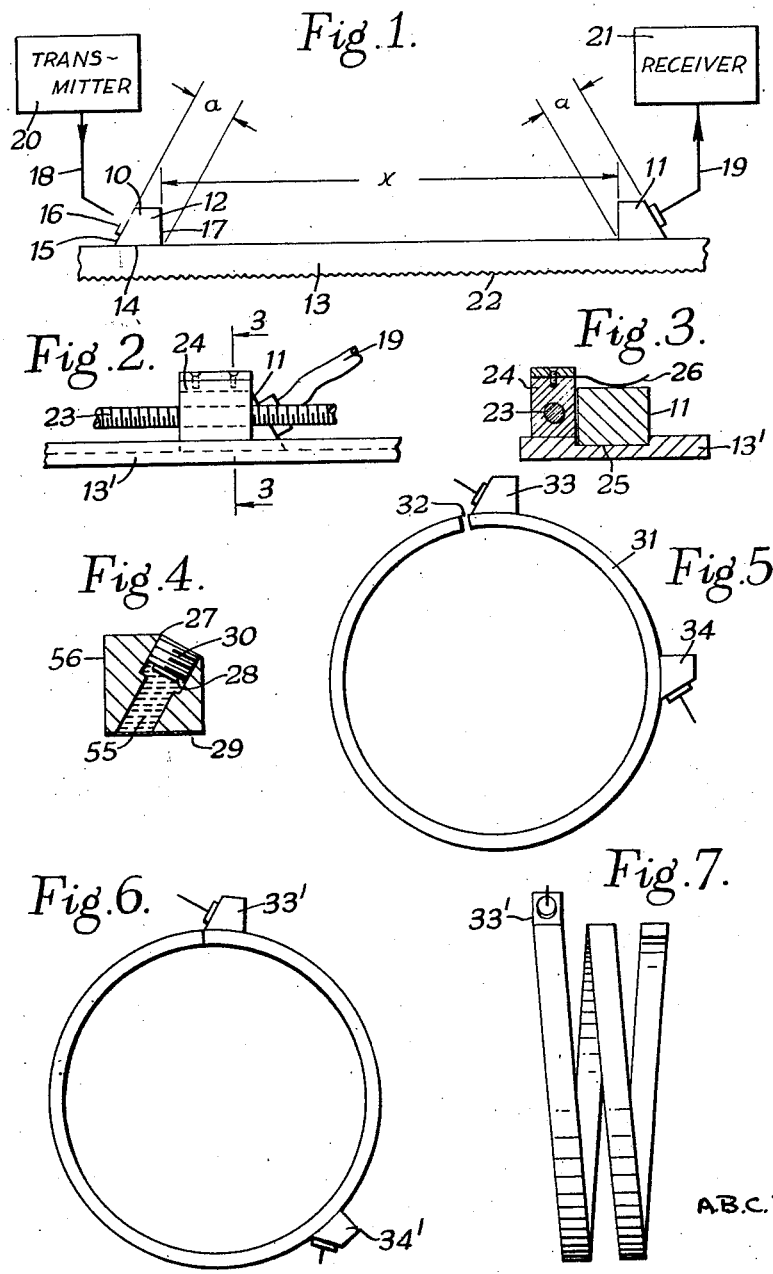

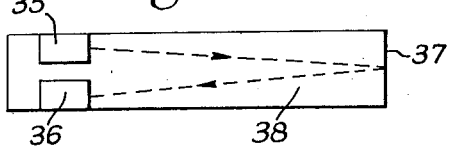
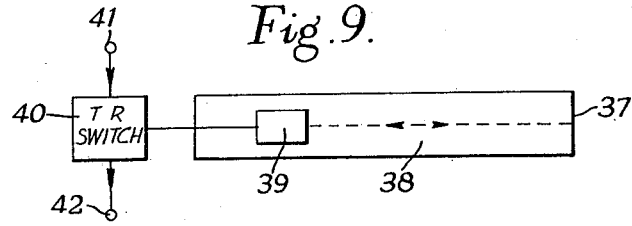
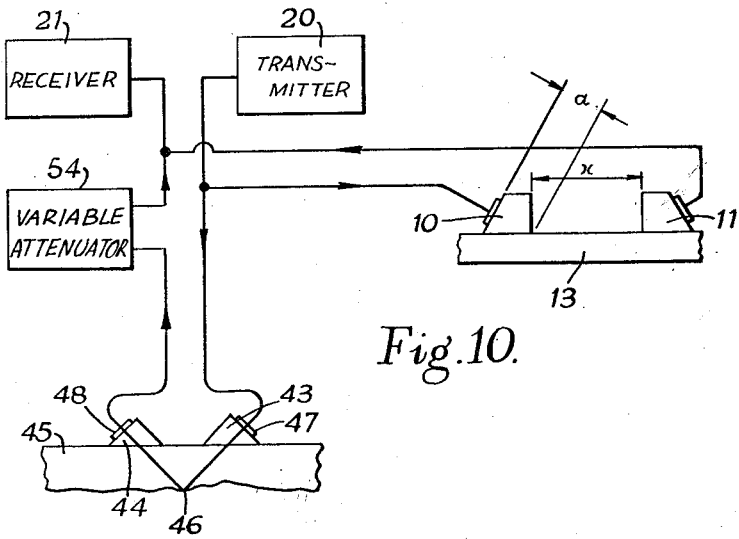
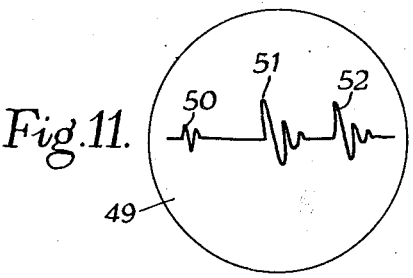

3,070,761
ULTRASONIC DELAY LINES
Alexander Bryce Calder Rankin, Barkingside, England, assignor to S. Smith & Sons (England) Limited, London, England, a British company
Continuation of abandoned application Ser. No. 428,084, May 6, 1954. This application May 16, 1961, Ser. No. 110,532
Claims priority, application Great Britain May 7, 1953
13 Claims. (Cl. 333—30)

The present invention relates to ultrasonic delay lines and is a continuation of application Serial No. 428,084 filed May 6, 1954, now abandoned.

It is well-known to construct an ultrasonic delay line in the form of a wave-transmitting medium along which ultrasonic waves are transmitted from an input piezoelectric crystal to an output piezo-electric crystal. In these known devices, the medium is usually a liquid when a variable delay is required, and may be solid when the required delay is fixed.

According to the present invention an ultrasonic delay line comprises an input probe having a surface in contact with a surface of a solid wave-transmitting body, the materials of said probe and said body being so selected that the velocity $C_1$ of transmission of longitudinal waves in the material of the probe is less than the velocity $C_2$ of transverse waves in the material of the body, means, such as a piezo-electric crystal, for generating and directing waves from the input probe through the said surfaces into the body at an angle of incidence slightly greater than $\sin^{-1} C_1/C_2$, and means for picking up waves from the body after transmission along the surface thereof from the input probe. The last-named means may be separate from the first-named means or one means may be provided for both generating and picking up the waves. The mode of wave-motion employed is that known as Rayleigh waves, which are surface waves and are described, for example, in Lamb's Dynamical Theory of Sound on pages 121 and 122. The velocity of Rayleigh waves is slightly less than the velocity of shear waves. A surface of said body which is parallel to the surface thereof which is in contact with the input probe has serrations therein, said serrations being of a size determined mainly by the frequencies of said waves and serving substantially to prevent waves of modes other than the Rayleigh mode from reaching the pick-up means.

The means by which the waves are picked up may comprise a second probe disposed to receive waves transmitted directly from the firstnamed probe or to receive waves from the first-named probe after reflection from a discontinuity, such as an edge of the body, and a transducer such as a piezo-electric crystal. Alternatively the last-mentioned means may include the first-named probe and a single transducer, waves being reflected back to this probe after reflection.

Where two probes are used, both may be fixed and the delay line then has a fixed delay time. Alternatively either or both probes may be mounted in such a way as to be movable along the body, suitable mechanical means being provided for this purpose.

In order that pure surface waves should be generated, as is highly desirable in delay lines, it is necessary that the longitudinal waves transmitted through the probe from the transducer and impinging upon the interface between the probe and the wave transmitting body should be in the form of a plane wave. This is very difficult to achieve in practice. The reasons for this are to be found in the practical characteristics associated with piezo-electric transducers. If one could use a sufficiently large diameter transducer and a sufficiently long path in the Perspex or crystal prism constituting the probe, the beam of longitudinal waves impinging upon the interface could be made a plane wave. In this case a pure surface wave would be obtained. Such an arrangement is, however, not practical since it would be far too bulky. In order to design a practical delay line which is reasonably compact it is necessary to use a transducer of small diameter and a relatively small Perspex prism. In such conditions the Fresnel diffraction which occurs gives rise to a number of different modes including principally shear wave modes. As shear waves travel at a velocity which is slightly greater than the velocity of the surface waves, when the body is of reasonably small cross-section the energy in the shear mode which is reflected from the opposite surface will arrive at the receiving transducer at about the same time as the surface wave. The effect of these shear waves is therefore to distort the phase and amplitude of the pulses picked up from the body.

As already indicated, the difficulty could be met by making the wave transmitting body sufficiently thick so that the two surfaces in question are spaced widely apart. The phase difference between the pulses transmitted by surface waves and by reflection from the other surface would then be great enough to avoid the difficulty. It will, however, be understood that this again involves a very bulky piece of apparatus.

The difficulty has been found to be overcome by the use of the serrations the dimensions of which are determined in accordance with known acoustic principles.

It is usually convenient, but not essential, to make the input and output probes of the same material.

The invention will be described by way of example with reference to the accompanying diagrammatic drawings in which FIG. 1 shows in front elevation one embodiment of the invention, FIGS. 2 and 3 are views in front and side elevation respectively of a modification of a part of FIG. 1, FIG. 4 shows the construction of a liquid probe for use in an arrangement such as that of FIG. 1, FIG. 5 is a view of a further embodiment, FIGS. 6 and 7 are views in front and side elevation of another embodiment.

FIGS. 8 and 9 are diagrams illustrating two further embodiments,

FIG. 10 is a diagram showing one application of the invention, and

FIG. 11 shows the screen of a cathode ray tube that may be used in FIG. 10.

In the embodiment of FIG. 1, two like probes 10 and 11 are provided. Each comprises a prism 12 of methyl methacrylate such as the material sold under the registered trademark "Perspex" having one face 14 adapted to rest upon a mild steel body 13 which may be in the form of a strip or bar, the said face of the probe, which will be referred to as the contact face, resting on a major surface of the strip or bar. A thin film of oil is provided between the contact face and the steel. The velocities of transmission of longitudinal waves in the material of the probes 10 and 11 are $C_1$ and $C_1'$ respectively, and in the present example when the same material is used for both probes $C_1=C_1'$. A second face 15 of each prism 12 is at an angle of 58° to the contact face and has fixed thereto a piezo-electric crystal 16 about 6 mm. in diameter. The angle of 58° is just greater than the value of $\sin^{-1} C_1/C_2$ for the materials referred to. A third face 17 of the prism is, in this example, at right angles to the contact face 14 and a plane through the junction of the contact face 14 and the third face 17 normal to the second face intersects the middle of the piezo-electric crystal 16. The distance between the second face 15 and the said junction in the said plane is indicated by $a$.

Assuming that the two probes are set up on the steel strip as shown with their third faces 17 parallel and facing one another at a distance of X from one another, the time delay $t$ between the application of the leading edge of an electric pulse from an oscillation generator or transmitter 20 through a lead 18 to the piezo-electric crystal 16 of one probe 10 and the generation of the leading edge of the delayed pulse in a receiver 21 connected through a lead 19 to the piezo-electric crystal of the second probe 11 is given by $t=2a/C_1+X/C_2$. This may be written $t=PX+Q$, where P and Q are constants.

It will be noted that Q cannot be made zero and hence there is a lower limit to the time delay that can be introduced by the device.

The under surface of the steel bar 13 is serrated as at 22 in order to scatter any waves of any mode other than the Rayleigh mode that may incidentally generated. Serrations 22 are an important feature of the invention and are applied to the surface of the wave transmitting body 13 opposite to that through which the waves are directed into and received from the body. The dimensions of serrations 22 are determined mainly by the frequency of the ultrasonic waves employed.

In a modification of the embodiment of FIG. 1 which will be described with reference to FIGS. 2 and 3, one of the probes, 10 of FIG. 1, is fixed and the other 11 shown in FIGS. 2 and 3, is mounted in such a manner as to be slidable along the steel strip 13', towards and away from the other probe, by means of a suitable screw mechanism comprising a lead screw 23 engaging in a threaded block 24 slidable along the upper surface of the body 13'. The body 13' is in this case slotted longitudinally at 25 and the probe 11 which is fixed to the block 24 is urged into the slot 25 by a spring 26. With this arrangement the time delay $t$ can then be varied between Q and an upper limit determined by the length of the steel strip 13' by operating the screw mechanism 23, 24.

Other materials can of course be used for the body 13 or 13'. If a higher velocity of transmission is desired the body may for example be of beryllium. If the material of the body is copper, the material of the probe may be, or comprise, a liquid or may be lead. If the liquid is water, $C_1/C_2$ has the value 0.76 approximately. As shown in FIG. 4, the liquid 55 is arranged in a container 56 open at the bottom and provided with a suitable filling aperture 27 near the top. A diaphragm 29 may be provided to retain the liquid if the probe is lifted off the body. The piezo-electric crystal 28 is arranged in contact with the liquid and is supported on a member 30 acting as a closure member.

It is not necessary that the wave-transmitting body should be straight since Rayleigh waves can readily be transmitted along curved surfaces. Thus for instance, as shown in FIG. 5, the body 31 may be bent into circular shape, a gap 32 being provided in a suitable position to prevent the waves being propagated more than once around the ring. The transmitting probe is shown at 33 and the receiving probe at 34. The latter may be made movable around the ring 31. Another shape, which is convenient where a long length of body is required in a small space, and which is shown in FIGS. 6 and 7, is a helical shape.

The transmitting and receiving probes are shown at 33' and 34' respectively.

Instead of mounting the two probes as described they may, as shown in FIG. 8, be mounted side by side, as at 35 and 36, and both facing the remote edge 37 of the steel strip 38. Waves transmitted by the probe 35 are then reflected at the edge 37 back to the other probe 36.

Alternatively, instead of providing the two probes 35 and 36, a single probe 39 may be provided for transmitting and receiving as shown in FIG. 9. A common T and R switch 40 is provided in known manner to couple input and output terminals 41 and 42, respectively, to the transducer of the probe 39.

A delay line according to this invention can be used for any purpose for which delay lines are required so long as the minimum delay to be introduced exceeds the limiting value Q above referred to.

One example of the use of the delay line is for the measurement of the thickness of a body by ultrasonic means and will be described with reference to FIG. 10. Two probes 43 and 44 are arranged in known manner on one surface of the body 45 whose thickness is to be measured and are so constructed and mounted that the probe 43 transmits ultrasonic waves into the body at a suitable inclination and the other probe 44 picks up the waves after reflection from the bottom 46 of the body. Both probes 43 and 44 have piezo-electric crystals 47 and 48 respectively as transducers. The crystal 47 of the transmitting probe is electrically connected to a suitable source 20 of bursts of electric oscillations and to the piezo-electric crystal of the input probe 10 of the delay line which is assumed to be constructed as described with reference to FIGS. 1 to 3. The crystal 48 of the receiving probe 44 of the measuring device is electrically connected to the crystal of the output probe 11 of the delay line and to a receiver 21 including an indicating device, such as the Y plates of a cathode ray oscilloscope the screen of which is shown in FIG. 11. A suitable X time-base voltage is applied to the X plates of the oscilloscope.

In operation, there are displayed on the screen of the oscilloscope, as shown in FIG. 11, waves 50, 51 and 52 representing respectively a transmitted burst of oscillation, the burst of oscillation picked up by the receiving probe of the measuring device, and the burst of oscillation picked up by the output probe of the delay line. The delay line is adjusted until the first wavefronts of the two last named bursts 51 and 52 are either in the same or in opposite phase and the distance X (FIG. 10) between the probes of the delay line then gives a measure of the thickness of the body being measured. This distance can be measured with considerable accuracy. A suitable electrical attenuator 54 is incorporated in order to permit the equalisation of the amplitudes of the two waves displayed on the oscilloscope screen.

The method of measurement described can clearly be applied to the measurement of dimensions other than thickness, such for example as the depth of a fault or the length or width of a body.

The method of measurement described can also readily be applied to the measurement of the velocity of ultrasonic wave propagation in bodies of known length, the waves being then transmitted between probes located at the two ends of the body facing one another.

The delay line of the present invention has a number of advantages over known delay lines. Some of these advantages are as follows.

The generation of Rayleigh waves in the present invention has advantages over known means for generating these waves using Y-cut crystals in that other modes of vibration are completely or almost completely avoided. The use of Rayleigh waves has the advantage over other modes that the attenuation is lower since the beam spread is planar and not circular and that the wave velocity has a lower temperature coefficient than longitudinal waves in liquid, and thermostatic controls are found not to be necessary in order to compensate for changes in ambient temperature. The use of a solid body, instead of a liquid such as is commonly employed, has the advantage of higher velocities of propagation resulting in a more open scale for either measuring or setting distances, thus leading to increased accuracy.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An ultrasonic delay line comprising a solid wave-transmitting body having first and second parallel body surfaces and wave transmitting and receiving means for directing waves into and receiving waves from said body, said means comprising a wave generator and a probe having first and second probe surfaces, said first probe surface being in wave transmitting relation to said first body surface, and said second probe surface being in wave-transmitting relation to said generator, the velocity $C_1$ of transmission of longitudinal waves in the material of said probe being less than the velocity $C_2$ of transverse waves in the material of said body, and the angle between said first and second probe surfaces being slightly greater than $\sin^{-1} C_1/C_2$, said second body surface having serrations therein, said serrations being of a size determined at least mainly by the frequency of said waves and serving substantially to prevent waves of modes other than the Rayleigh mode from reaching said receiving means.

2. An ultrasonic delay line comprising a solid wave-transmitting body, a generator of ultrasonic electric oscillations, wave-transmitting and receiving means for directing waves into and receiving waves from said body, said means comprising a probe having a first surface in wave-transmitting relation to a first surface of said body and a second surface, and transducer means in wave-transmitting relation to said second surface, and means coupling said generator to said transducer means to actuate said transducer means, the velocity $C_1$ of transmission of longitudinal waves in the material of said probe being less than the velocity $C_2$ of transverse waves in the material of said body, and the angle between said first and second surfaces of said probe being slightly greater than $\sin^{-1} C_1/C_2$, said body having a second surface substantially parallel to said first surface thereof, said second surface of said body having serrations therein, said serrations being of a size determined at least mainly by the frequency of said waves and serving substantially to prevent waves of modes other than the Rayleigh mode from reaching said receiving means.

3. A delay line according to claim 2, further comprising a further probe having a first surface in wave-transmitting relation to said first surface of said body and a second surface, and further transducer means in wave-transmitting relation to the last-named second surface, the velocity $C_1'$ of transmission of longitudinal waves in the material of said further probe being less than the velocity $C_2$ and the angle between the first and second surfaces of said further probe being slightly greater than $\sin^{-1} C_1'/C_2$.

4. A delay line according to claim 2, wherein means are provided for adjusting the position of said probe on said body.

5. A delay line according to claim 3, wherein means are provided for adjusting the spacing of said probes on said body.

6. An ultrasonic delay line comprising an elongated solid wave-transmitting body formed in a circular shape with the ends of said body spaced apart, wave-transmitting means for injecting ultrasonic waves into said body mounted upon a surface of said body and wave-receiving means mounted upon a region of said surface spaced from said wave-transmitting means for receiving waves transmitted thereto by said body from said wave-transmitting means, said wave-transmitting and wave-receiving means each comprising an electro-mechanical transducer and a wave-transmitting probe, said probe having a first surface in wave-transmitting relation to said surface of said body and a second surface in wave-transmitting relation to said transducer, the velocity $C_1$ of transmission of longitudinal waves in the material of said probe being less than the velocity $C_2$ of transverse waves in the material of said body, and the angle between said first and second probe surfaces being slightly greater than $\sin^{-1} C_1/C_2$.

7. An ultrasonic delay line comprising an elongated solid wave-transmitting body formed in a helical shape, wave-transmitting means for injecting ultrasonic waves into said body mounted upon a surface of said body and wave-receiving means mounted upon a region of said surface spaced from said wave-transmitting means for receiving waves transmitted thereto by said body from said wave-transmitting means, said wave-transmitting and wave-receiving means each comprising an electro-mechanical transducer and a wave-transmitting probe, said probe having a first surface in wave-transmitting relation to said surface of said body and a second surface in wave-transmitting relation to said transducer, the velocity $C_1$ of transmission of longitudinal waves in the material of said probe being less than the velocity $C_2$ of transverse waves in the material of said body, and the angle between said first and second probe surfaces being slightly greater than $\sin^{-1} C_1/C_2$.

8. An ultrasonic delay line comprising a solid wave-transmitting body and wave-transmitting and receiving means for directing waves into and receiving waves from said body, said means comprising a wave generator, a probe having a first surface in wave-transmitting relation to a surface of said body and a second surface in wave-transmitting relation to said generator, the velocity $C_1$ of transmission of longitudinal waves in the material of said probe being less than the velocity $C_2$ of transverse waves in the material of said body, and the angle between said first and second surfaces being slightly greater than $\sin^{-1} C_1/C_2$, said body having a second surface substantially parallel to said first surface, said second surface having serrations therein, said serrations being of a size determined at least in part by the acoustic properties of said body to cause the waves on said body to be Rayleigh waves.

9. An ultrasonic delay line comprising a solid wave-transmitting body, a generator of ultrasonic electric oscillations, wave-transmitting and receiving means for directing waves into and receiving waves from said body, said means comprising a probe having a first surface in wave-transmitting relation to a surface of said body and a second surface, and transducer means in wave-transmitting relation to said second surface, and means coupling said generator to said transducer means to actuate said transducer means, the velocity $C_1$ of transmission of longitudinal waves in the material of said probe being less than the velocity $C_2$ of transverse waves in the material of said body, and the angle between said first and second surfaces being slightly greater than $\sin^{-1} C_1/C_2$ said body having a second surface substantially parallel to said first surface, said second surface having serrations therein, said serrations being of a size determined at least in part by the acoustic properties of said body to cause the waves on said body to be Rayleigh waves.

10. A delay line according to claim 9, wherein a further surface of said body substantially parallel to the first-named surface thereof is serrated.

11. A delay line according to claim 9, further comprising a further probe having a first surface in wave-transmitting relation to said surface of said body and a second surface, and further transducer means in wave-transmitting relation to the last-named second surface, the velocity $C_1'$ of transmission of longitudinal waves in the material of said further probe being less than the velocity $C_2$ and the angle between the first and second surfaces of said further probe being slightly greater than $\sin^{-1} C_1/C_2$, said body having a second surface substantially parallel to said first surface, said second surface having serrations therein, said serrations being of a size determined at least in part by the acoustic properties of said body to cause the waves on said body to be Rayleigh waves.

12. A delay line according to claim 9, wherein means are provided for adjusting the position of said probe on said body.

13. A delay line according to claim 11, wherein means are provided for adjusting the spacing of said probes on said body.

References Cited in the file of this patent

UNITED STATES PATENTS

| | | |
|---|---|---|
| 2,416,337 | Mason | Feb. 25, 1947 |
| 2,439,130 | Firestone | Apr. 6, 1948 |
| 2,503,831 | Mason | Apr. 11, 1950 |
| 2,505,515 | Arenberg | Apr. 25, 1950 |
| 2,527,986 | Carlin | Oct. 21, 1950 |
| 2,545,309 | Roberts | Mar. 13, 1951 |
| 2,565,725 | Frederick et al. | Aug. 28, 1951 |
| 2,661,714 | Greenwood et al. | Dec. 8, 1953 |
| 2,697,936 | Farrow | Dec. 28, 1954 |
| 2,702,885 | Shapiro | Feb. 22, 1955 |
| 2,727,214 | McSkimin | Dec. 13, 1955 |
| 2,787,160 | Van Valkenburg | Apr. 2, 1957 |

FOREIGN PATENTS

| | | |
|---|---|---|
| 714,564 | Great Britain | Sept. 1, 1954 |